United States Patent
Irle et al.

(10) Patent No.: US 12,522,286 B2
(45) Date of Patent: Jan. 13, 2026

(54) ELONGATE BODY COMPRISING A CURSOR BAND FOR A VEHICLE SYSTEM OF A VEHICLE

(71) Applicant: HELLA GmbH & Co. KGaA, Lippstadt (DE)

(72) Inventors: Henning Irle, Lippstadt (DE); Sebastian Forst, Kamen (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 192 days.

(21) Appl. No.: 18/224,341

(22) Filed: Jul. 20, 2023

(65) Prior Publication Data
US 2023/0356776 A1    Nov. 9, 2023

Related U.S. Application Data

(63) Continuation of application No. PCT/EP2021/081025, filed on Nov. 9, 2021.

(30) Foreign Application Priority Data

Jan. 21, 2021   (DE) ...................... 10 2021 101 209.0
Jul. 13, 2021   (DE) ...................... 10 2021 118 077.5

(51) Int. Cl.
   *B62D 6/00*    (2006.01)
   *B62D 15/02*   (2006.01)

(52) U.S. Cl.
   CPC .......... *B62D 6/008* (2013.01); *B62D 15/021* (2013.01)

(58) Field of Classification Search
   CPC .... B62D 6/008; B62D 15/021; G01D 5/2046; G01D 2205/771; G01D 5/2452; G01D 5/2053
   See application file for complete search history.

(56) References Cited

U.S. PATENT DOCUMENTS

| | | |
|---|---|---|
| 4,820,961 A | 4/1989 | McMullin |
| 5,886,519 A | 3/1999 | Masreliez et al. |
| (Continued) | | |

FOREIGN PATENT DOCUMENTS

| | | |
|---|---|---|
| CN | 103256911 A | 8/2013 |
| DE | 2256099 A1 | 5/1974 |
| (Continued) | | |

OTHER PUBLICATIONS

International Search Report dated Feb. 18, 2022 in corresponding application PCT/EP2021/081025.

*Primary Examiner* — Grant Moubry
*Assistant Examiner* — Ruben Picon-Feliciano
(74) *Attorney, Agent, or Firm* — Muncy, Geissler, Olds & Lowe, P.C.

(57) ABSTRACT

An elongate body for a vehicle system of a vehicle, the body having at least one cursor band for an inductive linear displacement sensor, the at least one cursor band extending in the direction of a longitudinal extent of the body, the at least one cursor band being designed with a plurality of electrically conductive cursor pads in order to inductively couple at least one excitation coil to at least one sensor coil of a stator of the linear displacement sensor and being designed with non-coupling sections which are electrically less conductive or non-conductive with respect to the cursor pads, the cursor pads being spaced apart from one another in the direction of the longitudinal extent in each case by the non-coupling sections, and the cursor pads of the cursor band being formed on the body.

15 Claims, 7 Drawing Sheets

(56) References Cited

U.S. PATENT DOCUMENTS

| | | | |
|---|---|---|---|
| 9,958,296 B2 | 5/2018 | Heumann et al. | |
| 10,551,217 B2 | 2/2020 | Cook | |
| 10,876,861 B2 | 12/2020 | Howard et al. | |
| 2004/0245041 A1* | 12/2004 | Fukuda | B62D 6/008 180/444 |

FOREIGN PATENT DOCUMENTS

| | | |
|---|---|---|
| DE | 10010042 A1 | 7/2001 |
| DE | 102018102698 A1 | 8/2019 |
| DE | 102019209494 A1 | 1/2020 |
| DE | 102019207070 A1 | 11/2020 |
| EP | 0289033 A2 | 11/1988 |
| EP | 3012636 A1 | 4/2016 |
| EP | 3179214 A1 | 6/2017 |
| EP | 3479072 A1 | 5/2019 |
| JP | H10213408 A | 8/1998 |

* cited by examiner

ELONGATE BODY COMPRISING A CURSOR BAND FOR A VEHICLE SYSTEM OF A VEHICLE

This nonprovisional application is a continuation of International Application No. PCT/EP2021/081025, which was filed on Nov. 9, 2021, and which claims priority to German Patent Application No. 10 2021 101 209.0, which was filed in Germany on Jan. 21, 2021, and to German Patent Application No. 10 2021 118 077.5, which was filed in Germany on Jul. 13, 2021, and which are all herein incorporated by reference.

BACKGROUND OF THE INVENTION

Field of the Invention

The present invention relates to an elongate body comprising a cursor band for a vehicle system of a vehicle, a vehicle system assembly, a steering system of a vehicle, and a vehicle.

Description of the Background Art

An inductive linear displacement sensor is known from DE 10 2018 102 698 A1. The linear displacement sensor is designed with a part, movable relative to a stator, and a cursor arranged thereon having a three-dimensional shape. The movable part and the cursor are arranged to be rotatable about a common axis of rotation. The linear displacement sensor is thus designed as an inductive rotation angle sensor for detecting an angle of rotation of the movable part relative to the stator.

It has been shown that the inductive rotation angle sensor described is particularly advantageous for certain applications in the vehicle with small movements, such as a variable camshaft adjustment.

For some applications, such as a vehicle steering system, inductive rotation angle sensors are not suitable due to the ambiguity, arising in interpreting their measurement results, in regard to possible multiple turns resulting from the multiple turns of the steering wheel movement in steering systems, also known as the multi-turn problem. This is because the detection based on multiple turns of the steering wheel movement is complicated in terms of sensors because the multiple turns (often referred to as multi-turns) have to be counted or reduced.

In future steer-by-wire steering systems, the problem of ambiguity can increase because the steering column is omitted in these, and the steering wheel angle is to be understood as a position control task. This is different from today's power steering in vehicles, in which primarily the torque is controlled, therefore, a support of the force applied by the driver at the steering wheel.

For position control in steer-by-wire steering systems, a target position and an actual position detection with a high precision are required.

In some automotive applications, such as the steering system, comparatively long paths of about 20 to 30 cm must also be measured. This makes inductive position sensors very large and comparatively expensive, especially when designed as inductive rotation angle sensors and apart from the ambiguity problem.

SUMMARY OF THE INVENTION

It is therefore an object of the present invention to provide a simplified possibility for a precise measurement of a position in a vehicle system that can measure comparatively long paths in a compact and inexpensive design and does not have the problem of ambiguity.

Features and details disclosed in relation to the elongate body of the invention also apply, of course, in relation to the vehicle system assembly of the invention, to the steering system of the invention, and to the vehicle of the invention, and conversely in each case, so that with regard to the disclosure, reference is or can always be made mutually to the individual aspects of the invention.

According to a first aspect of the invention, the object is achieved by an elongate body or, in other words, a longitudinally extending body or longitudinal body for a vehicle system of a vehicle. The body has at least one cursor band for an inductive linear displacement sensor. The at least one cursor band extends in the direction of a longitudinal extent of the body. The at least one cursor band is designed with a plurality of electrically conductive cursor pads in order to inductively couple at least one excitation coil to at least one sensor coil of a stator of the linear displacement sensor and is designed with non-coupling sections which are electrically less conductive or non-conductive with respect to the cursor pads. The cursor pads are spaced apart from one another in the direction of the longitudinal extent in each case by the non-coupling sections. The cursor pads of the cursor band are connected to the body.

The arrangement of the cursor band on the elongate body of the vehicle system according to the invention achieves a compact and simple measurability of the linear position of the elongate body within the vehicle system. Advantages of the resulting inductive linear displacement sensor (hereinafter also referred to simply as linear displacement sensor) lie in particular in the fact that the design of the cursor as a cursor band on the elongate body enables inductive sensing of the linear position of the at least one cursor band relative to the stator in a simple manner. For this purpose, the linear displacement sensor, in particular the stator, can have an evaluation circuit that is set up to detect a linear position of the at least one cursor band relative to the stator as a function of the inductive coupling between the at least one excitation coil and the at least one sensor coil. In an application with a steering actuator rod or when the elongate body is formed as a steering actuator rod, which is an exemplary embodiment of the elongate body, the linear displacement sensor eliminates the problem of ambiguity outlined at the beginning and the linear displacement sensor can be comparatively compact and still measure comparatively long linear paths in the range of up to 30 or 40 cm without difficulty.

The cursor pads can alternate linearly cyclically with the non-coupling sections in the extent of the at least one cursor band. The cursor pads can be made of a metallic material. In particular, the cursor pads can be made of an electrically conductive solid material. As a result, the at least one cursor band and thus the linear displacement sensor are designed to be very robust and thus also suitable for particularly adverse environmental conditions. Also, the electrically conductive material of the cursor pads can preferably be formed as a non-ferromagnetic material, such as, for example, copper, aluminum, stainless steel, or the like. As a result, the cursor pads are particularly suitable for use under corrosive ambient conditions.

The non-coupling sections, in contrast, can be made of a non-metallic material, particularly an electrically insulating material or insulator. For example, the non-coupling sections can be made of a plastic. This ensures that the non-coupling sections do not falsify the measurement results of the linear displacement sensor. In a preferred embodiment explained in more detail later, the non-coupling section can be formed by a free space or air space between the cursor pads.

In principle, it is sufficient if the elongate body is formed with only one cursor band. The cursor band forms a track with inductive coupling sections in the form of the cursor pads and the non-coupling sections, to which the at least one sensor coil of the stator is assigned.

However, it can also be provided that the body has at least two cursor bands. The cursor pads of the two cursor bands can be arranged offset from one another in the direction of the longitudinal extent of the cursor bands. It is possible in addition, for example, for the cursor pads to be arranged parallel to one another. Accordingly, the stator of the linear displacement sensor can also have at least two sensor coils, or the linear displacement sensor can have two stators, each with at least one sensor coil. Accordingly, the cursor bands can each be arranged movable relative to a sensor coil or a stator and be arranged parallel to one another. Each of the cursor bands can thus be assigned a sensor coil of the stator or a stator. In particular, a sensor coil associated with each cursor band can be opposite the respective cursor band. In this way, an inductive coupling of the excitation coil with mutually different sensor coils can be achieved in each case, each of which is assigned to different cursor bands. Further, it is possible to use more than two sensor coils and more than two cursor bands. This can further improve the inductive linear position detection by the linear displacement sensor.

In addition, it can also be provided that the at least two cursor bands are arranged on opposite or adjacent sides of the body. This results in a compact design of the body with the cursor bands. In this case, the sensor coils assigned to the respective cursor bands can also be arranged opposite or adjacent to one another. The two cursor bands can also face each other in a V-shape, have a common central web, and be made as a stamped/bent part.

It can also be provided that the at least two cursor bands each have a different number of cursor pads. In addition, the evaluation circuit of the linear displacement sensor can be set up to evaluate the covered linear path covered on the basis of the at least two cursor bands and at least two sensor coils in the manner of the nonius principle. This enables an inductive detection of the linear position of the elongate body, on which the cursor bands are formed relative to the stator, at any time and with high precision. This capability is also referred to as "true power on," according to which position detection is also possible directly after the linear displacement sensor is turned on, therefore, after it has been transferred to its operating state. Accordingly, indexing or the like is also not required for the linear displacement sensor according to the present embodiment.

Designed in the manner of the nonius principle, it is also possible to speak of two different measurement paths or tracks which are provided by the at least two cursor bands. In principle, the cursor bands can be arranged next to one another or on top of one another or parallel to one another. In principle, the cursor pads can have a length in the range of, for example, 1 to 10 cm, in particular in the range of, for example, 1 to 5 cm. However, in the manner of the nonius principle, a relative displacement or movement of the cursor, formed by the cursor bands, or of the movable part attached thereto, even a much greater length of 30 cm or more can be easily and precisely measured by means of the evaluation circuit.

The nonius principle basically works in such a way that the cursor is moved over or parallel to initially one of the two nonius tracks or sensor coils of the at least one stator. This results in a linear increase in the sensor output signal with the relative displacement of the cursor band with respect to the at least one stator along the direction of movement. In the present case, the cursor is formed by the cursor bands. This means that if a cursor pad of the cursor band leaves the detection field of at least one stator, the next cursor pad already enters it. In detail, the principle can usually be improved by using not only two cursor pads, but three or more cursor pads in the cursor band, because then one cursor pad always enters, one cursor pad is fully detected or is fully within the detection field, and a third cursor pad just leaves it. A triangular signal thus forms as the output signal.

The second nonius track or the second sensor coil with the second cursor band now comes into play, which generates a phase-shifted triangular signal of different length. Both nonius tracks or cursor bands with the sensor coils assigned to them can be calculated in the evaluation device by means of a nonius algorithm. Thus, a linear displacement sensor is provided that is unambiguous on the desired measurement path of 10 cm or more due to the different lengths of the cursor bands and the located phase relationship. Thus, by providing two parallel cursor bands and two sensor coils, each forming a nonius track, an attractive and extremely compact linear displacement sensor is achieved in terms of cost. In contrast, known linear displacement sensors often have the problem that the quotient of installation space length and measurement path is very large for such sensors, which is disadvantageous.

Further, it can be provided that the cursor pads are formed as elevations of the body or on elevations of the body which are elevated relative to the non-coupling sections. This is a structurally simple way that the sensor coils can be brought close to the cursor pads in order to be precisely detected. The non-coupling sections, in contrast, can have a greater distance from the at least one sensor coil than the cursor pads. This can prevent the non-coupling sections from being inductively coupled to the at least one sensor coil.

It can be provided in this regard that a cross section of the elevations has a mushroom shape. The mushroom shape can essentially also be regarded as a T-shape. In this case, a stem or column of the mushroom shape or T-shape can extend away from the body. A cap of the mushroom shape or a platform of the T-shape substantially perpendicular thereto can be disposed on the opposite side from which the stem or column extends. The cap or platform can then form the cursor pad, or the cursor pad can be formed thereon. Experiments have shown that such a mushroom shape or T-shape enables a particularly precise measurement of the linear position, because the stem or column decouples the cursor pad as far as possible from the body, which can then also be formed from an electrically conductive material, or the entire body can then be formed in one piece, as will be explained in more detail later.

It can also be provided that the elevations are flattened on a top side facing away from the body. The top side in an elevation in a mushroom shape or T-shape can be on the cap or platform, respectively. With regard to the flattened or, in other words, planar top side, it has been shown that this also helps to improve the detection accuracy of the sensor signals.

It can also be provided that the non-coupling sections are formed by grooves between the cursor pads. The grooves can extend into the body. The body can basically have a round or rectangular cross section, which can be flattened by the grooves. The grooves create an air space or free space between the cursor pads, which, together with the distance between possible elevations relative to the grooves, provides for the lower electrical conductivity of the non-coupling sections, or at least ensures that the non-coupling sections are not inductively coupled by the stator(s). In other words, the grooves make it possible in a particularly easy way to provide the non-coupling sections in order to avoid inductive coupling of these sections to the at least one sensor coil. Due to the grooves, there is only air or an air space between the cursor pads, which separates the cursor pads from one another and prevents unwanted measurement influences. The grooves can be cut out of the body, for example, or the body can be molded as a whole with the grooves if the body is formed from a metal or is made of a plastic.

Furthermore, it can be provided that the cursor pads of the cursor band are integrally bonded to the body. It is possible, for example, to weld, mold, and/or glue the cursor pads to the cursor band. Advantageously, an attachment method that is as non-destructive as possible is chosen in order not to impair the application, but which at the same time is suitable for ensuring a secure attachment, so that the attachment or fixed position of the at least one cursor band to the body is not lost, which could otherwise lead to measurement errors. Alternatively, the cursor pads can be secured to the body, for example, mechanically by screwing, clamping, or the like.

In particular, it can be provided that the body and the at least one cursor band are formed in one piece. In other words, the at least one cursor band or cursor pads can be formed monolithically with the body. The entire body with the cursor pads can be made of a metallic material, for example. In particular, the body with the cursor pads integrally formed thereon can be made of an electrically conductive solid material. As a result, the at least one cursor band is arranged on the body in an absolutely slip-proof manner and the linear displacement sensor is thus formed to be very robust. Also, the electrically conductive material of the body can preferably be formed as a non-ferromagnetic material, such as, for example, copper, aluminum, stainless steel, or the like. As a result, the body is particularly suitable for use under corrosive ambient conditions.

Alternatively, it can be provided that the body is formed of a support material to which the cursor pads are applied in the form of conductive platelets and/or conductive coatings. The support can, for example, be made of a plastic material, in particular injection molded. The support, which can alternatively be referred to as a core, enables, among other things, a particularly simple subsequent attachment of the at least one cursor band to the body. The cursor pads can, for example, be applied to the support as individual electrically conductive platelets, in particular metal platelets, or electrically conductive coatings, in particular metal coatings, for instance, by gluing or by some other process, such as immersion in a liquid metal bath. The cursor pads can also be manufactured using a sintering process. This has the advantage that the arising manufacturing tolerances caused by the process are further limited and can therefore be optimally designed for the sensor system. Accordingly, the body need not be formed entirely of an electrically conductive material. It is sufficient if only the coating arranged on the core or the support or the platelets arranged thereon are formed electrically conductive, which reduces the manufacturing costs of a corresponding steering assembly of the body with the linear displacement sensor. Nevertheless, such a body is less stable.

It is possible, for example, that the body is formed as a steering actuator rod, a piston rod, or a rail. In the embodiment of the body as a steering actuator rod, the associated vehicle system is a steering system of the steering actuator rod. In the embodiment of the body as a piston rod, the associated vehicle system can be, for example, a shock absorber of the vehicle. In the embodiment of the body as a rail, the rail can be, for example, a seat rail for a vehicle seat, which represents the vehicle system. These exemplary embodiments of the body and the vehicle system are chosen merely as examples. Many more exemplary embodiments of the body in various vehicle systems of a vehicle are possible, in which a linear path or a linear displacement must or should be measured and the invention achieves the previously described advantages.

According to a second aspect of the invention, the aforementioned object is achieved by a vehicle system assembly comprising the elongate body according to the first aspect of the invention and the inductive linear displacement sensor. The linear displacement sensor has the stator with the at least one excitation coil and the at least one sensor coil as well as an evaluation circuit. The evaluation circuit is configured to detect a linear position of the body based on the at least one cursor band relative to the stator as a function of the inductive coupling between the at least one excitation coil and the at least one sensor coil.

In particular, it can be provided that the inductive linear displacement sensor (hereinafter also referred to simply as linear displacement sensor) is set up by means of the evaluation circuit to detect a linear path covered by the at least one cursor band relative to the stator during a movement of the at least one cursor band in the linear direction of movement.

The mode of operation of the inductive measurement between a stator and a cursor is known to the skilled artisan in a fundamental manner, for example, from DE 10 2018 102 698 A1, which is incorporated herein by reference, as well as sensors with the brand name CIPOS® marketed by the company HELLA GmbH & Co. KGaA.

In particular, the stator can be designed as a printed circuit board with the at least one excitation coil and at least one sensor coil arranged thereon. The stator or circuit board can also have the evaluation circuit. When using a body with at least two cursor bands, it is also possible to use at least two stators of the linear displacement sensor, wherein one stator with at least one sensor coil can be assigned to each cursor band.

The inductive linear displacement sensor can be an incremental encoder as well as a sensor that enables absolute detection of the linear position of the at least one cursor band relative to the stator. By means of an incremental encoder, only a digital detection of the linear position of the at least one cursor band relative to the stator is possible, which also depends on the history of the previously counted increments and thus cannot provide any immediate absolute position information after a restart or after the turning on of the linear displacement sensor or higher-level system. By means of the evaluation circuit of the linear displacement sensor, not only the linear position of the at least one cursor band relative to the stator, but also a linear path covered by the at least one cursor band and/or a relative speed between the at least one cursor band and the stator can be determined in a manner known to the skilled artisan. Further, the evaluation circuit can comprise electronics for signal amplification and signal conditioning.

In a steering assembly as an exemplary vehicle system assembly, a steering actuator rod or rack is used on which the at least one cursor band is arranged. The stator or stators, in contrast, can be positioned on an immovable or non-moving part relative to which the steering actuator rod is moved or displaced linearly. Thus, a linear movement of the at least one cursor band directly leads to an identical position displacement of the linear position of the at least one cursor band and the steering actuator rod relative to the non-moving part or stator. The linear position or linear movement of the at least one cursor band detected by the stator or the evaluation circuit can thus be used to directly or immediately infer the linear position or linear movement of the steering actuator rod, which can be detected in regard to its linear displacement without any possible slippage of the at least one cursor band from the steering actuator rod. In a steering system with the steering assembly, the linear displacement of the steering actuator rod thus corresponds to a changed linear position of the at least one cursor band arranged thereon, so that the linear displacement can be detected by means of the linear displacement sensor in order to execute a corresponding steering movement based on it.

According to a third aspect of the invention, the aforementioned object is achieved by a steering system for a vehicle, wherein the steering system has the vehicle system assembly formed as a steering assembly according to the second aspect of the invention.

The steering system of the vehicle can have known components such as a steering element, for example, a steering wheel, a vehicle axle, etc.

It can be provided that the steering system is designed as a steer-by-wire system with a control unit and an electromechanical actuator. The control unit can be coupled to the linear displacement sensor. The control unit can be set up to convert the linear position detected by the linear displacement sensor into a steering command for the electromechanical actuator and to transmit it to the electromechanical actuator, so that the electromechanical actuator can execute a steering movement corresponding to the steering command.

The electromechanical actuator can be, for example, an electric motor or any other type of actuator that can perform the steering movement on the vehicle.

The linear displacement sensor can be arranged at least partially in or on a housing of a power unit of the steering system, which has at least the electromechanical actuator. Such power units are often also referred to as power packs and also comprise the control unit of the steer-by-wire system.

According to a further aspect of the invention, the aforementioned object is achieved by a vehicle, in particular a motor vehicle, such as, for example, a passenger car or truck, having a vehicle system assembly according to the invention or a steering system according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
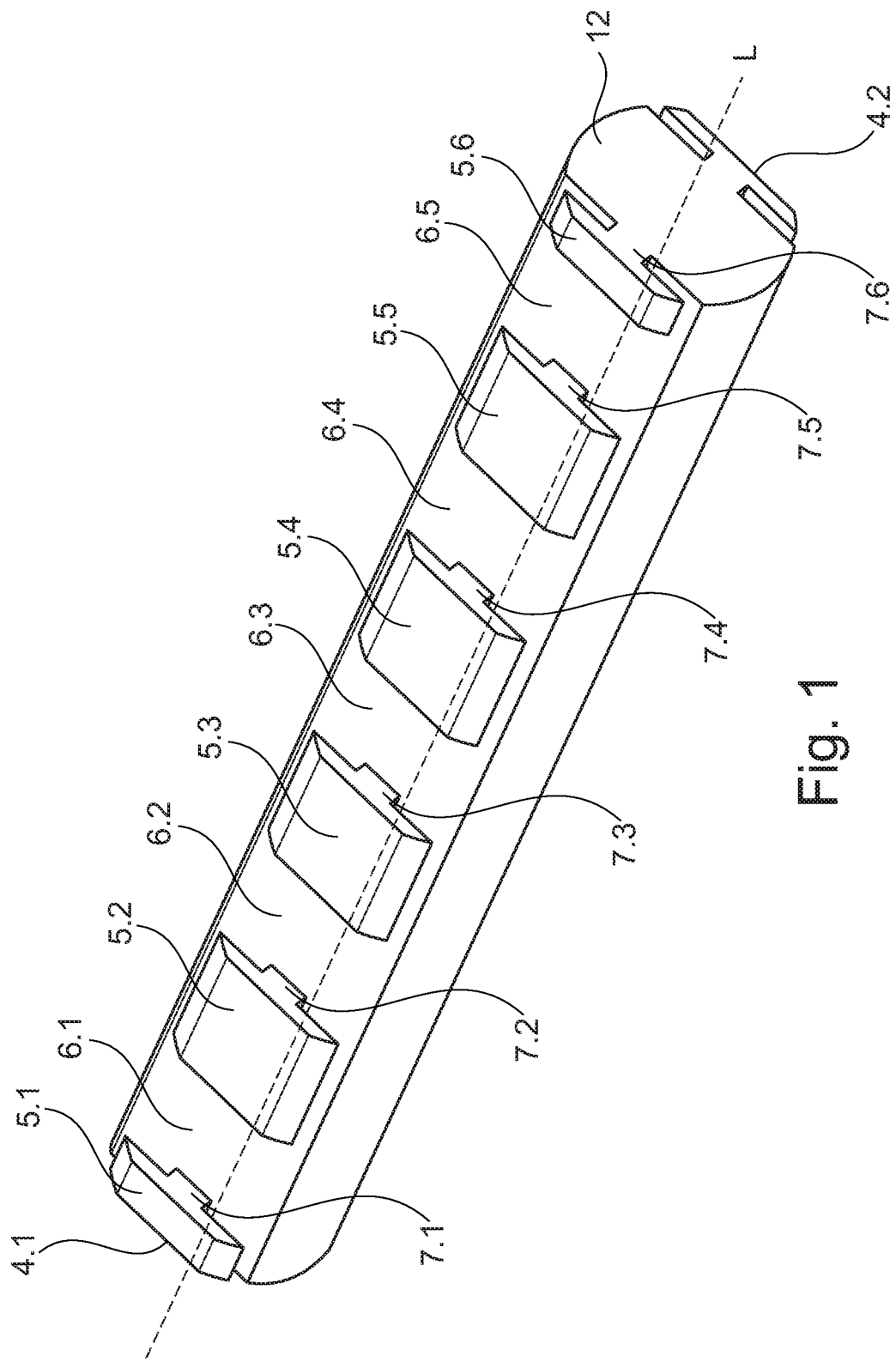
FIG. 1 shows a perspective view of a steering actuator rod.

FIG. 1 shows a steering actuator rod 12 in a perspective view. Steering actuator rod 12 is shown here only in an excerpt or with a partial length of the true length of steering actuator rod 12, which can be significantly longer, as can be gathered in principle from FIG. 7, for example. Steering actuator rod 12 extends along a longitudinal axis L.

Thus, steering actuator rod 12 shown and described herein is merely an exemplary embodiment of an elongate body 12 of the invention. Alternatively, elongate body 12 can be formed, for example, as a piston rod of a shock absorber or a seat rail of a vehicle seat in the vehicle. In this respect, what is shown and described in the context of FIGS. 1 to 7 with respect to the embodiment of elongate body 12 applies analogously to the generic embodiment as an elongate body 12 in a vehicle system of a vehicle as well as to specific embodiments.

A cursor, which in the present case is formed by two cursor bands 4.1, 4.2, is formed on a part, in particular at or near one end, of steering actuator rod 12. Here, from the perspective shown, only cursor band 4.1 is fully visible, whereas cursor band 4.2 opposite cursor band 4.1 is concealed by steering actuator rod 12 or its rod body. However, the two cursor bands 4.1, 4.2 are basically constructed with the same elements.

Figure 4:
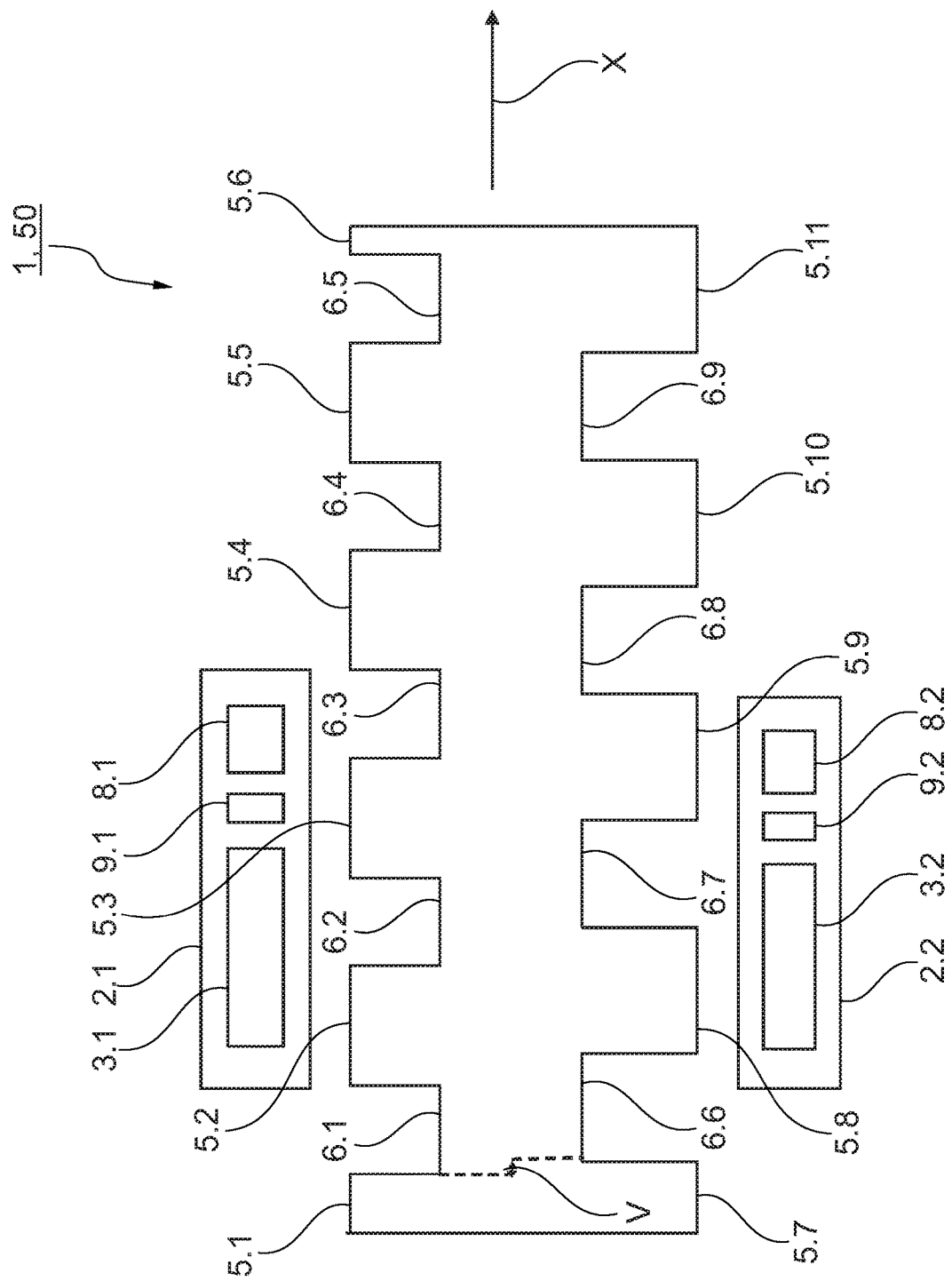
FIG. 4 shows a cross section of a steering assembly with the steering actuator rod of FIG. 1.

Cursor band 4.1 has linearly cyclically spaced cursor pads 5.1, 5.2, 5.3, 5.4, 5.5, 5.6, wherein one of the plurality of non-coupling sections 6.1, 6.2, 6.3, 6.4, 6.5 is disposed between each two cursor pads 5 (see also cursor pads 5.7, 5.8, 5.9, 5.10, 5.11 and non-coupling sections 6.6, 6.7, 6.8, 6.9 of cursor band 4.2 in FIG. 4). Cursor pads 5 serve as inductive coupling regions for stators 2.1, 2.2 with their sensor coil sets 3.1, 3.2, as can be seen in FIG. 4 and explained in more detail later with reference to FIG. 4. Here, the coil sets comprise one to n individual receiver coils each. For the widely used CIPOS® technology, these are three individual receiver coils per receiver coil set.

In the present case, steering actuator rod 12 with cursor pads 5 is formed in one piece from an electrically conductive material, in particular from a metallic material. For this purpose, steering actuator rod 12 with the area of cursor pads 5 and non-coupling sections 6 can be cut, for example, from a cast or deep-drawn cylindrical rod.

In principle, the number of cursor pads 5 and non-coupling sections 6 can be freely selected according to the respective requirement, in particular the linear path to be measured in the process. Thus, for example, the number of cursor pads 5 can be between 3 and 30, especially between 5 and 20. Similarly, the number of non-coupling sections 6 can be between 2 and 29, in particular between 4 and 19.

The non-coupling sections 6 can be formed by a material less electrically conductive than cursor pads 5 or a non-electrically conductive material. In particular, they can be formed by an insulator between cursor pads 5. In the present case, however, non-coupling sections 6 are formed in a simplified manner by grooves in cursor bands 4.1, 4.2 between two cursor pads 5 each of each cursor band 4.1, 4.2, which form free spaces between cursor pads 5. This is a particularly preferred embodiment variant of non-coupling sections 6 because the cursor can be manufactured easily and inexpensively thereby, and good measurement results can be achieved. In particular, because cursor pads 5 project beyond the grooves or groove surfaces of the grooves in the form of elevations 7.1, 7.2, 7.3, 7.4, 7.5, 7.6, 7.7 (see also FIG. 2), which are mushroom-shaped in cross section, no additional insulator needs to be used.

Figure 2:
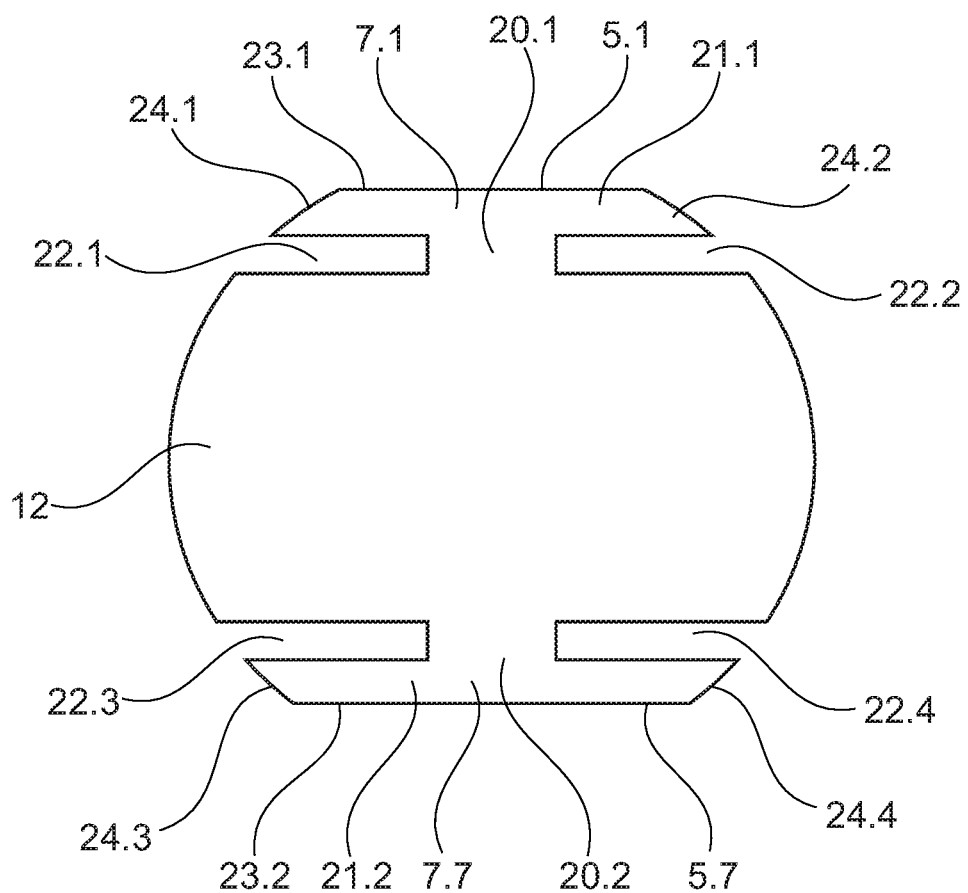
FIG. 2 shows a cross section of the steering actuator rod of FIG. 1.

FIG. 2, in a cross section of steering actuator rod 12, shows elevations 7.1, 7.7 that form the opposite cursor pads 5.1, 5.7. The opposite cursor pads 5.1, 5.7 have a mushroom shape or T-shape with a stem or column 20.1, 20.2, respectively, each extending away from steering actuator rod 12. On column 20.1, 20.2 there is in each case a platform 21.1, 21.2 or a plate-shaped element which extends over the underlying surface of steering actuator rod 12, in particular extends parallel to it. Platforms 21.1, 21.2 are preferably, but not necessarily, flattened or provided with a flat surface on their top sides 23.1, 23.2. Outer edges 24.1, 24.2, 24.3, 24.4 located transversely to the extent of steering actuator rod 12 and opposite one another in this transverse direction are beveled. Columns 20.1, 20.2 are formed by slits 22.1, 22.2, 22.3, 22.4 between steering actuator rod 12 or its rod-shaped body and platforms 21.1, 21.2. In other words, due to each of slits 22.1, 22.2, 22.3, 22.4, there is a free space between platforms 21.1, 21.2 and the body of steering actuator rod 12.

Figure 3:
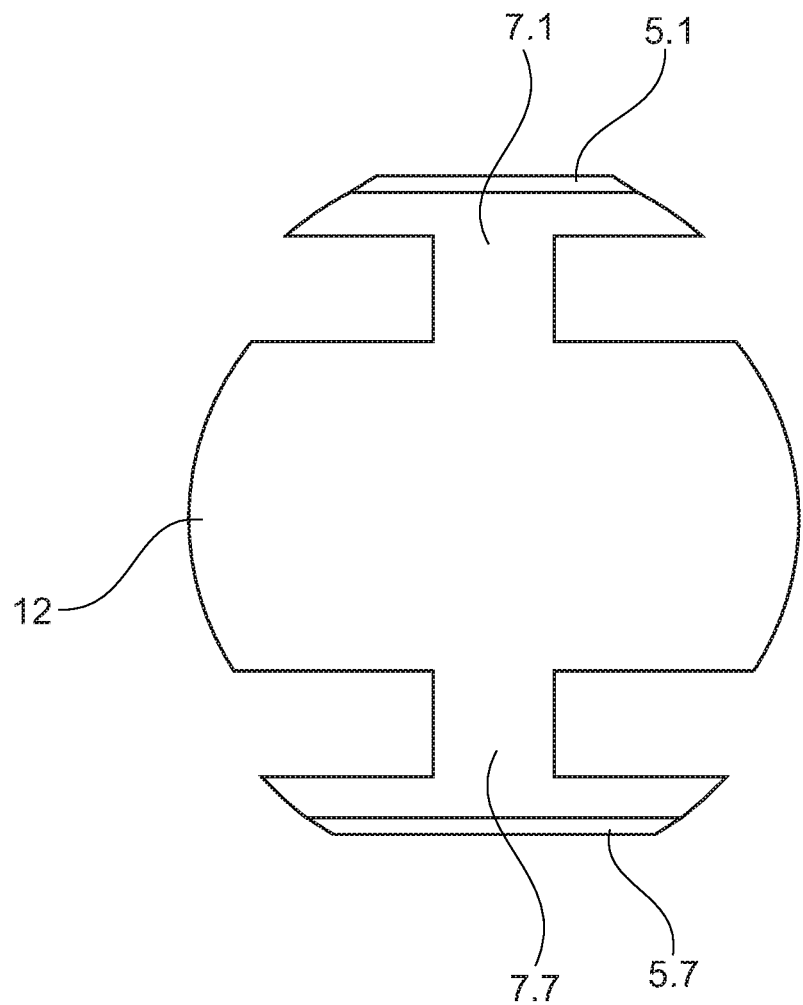
FIG. 3 shows an alternative cross section of the steering actuator rod of FIG. 1.

FIG. 3 shows an alternative embodiment for forming the entire steering actuator rod 12 in a one-piece design from a metallic material. In the present case, steering actuator rod 12 and elevations 7.1, 7.7 are made from a support or core of, for example, plastic. In this case, the support or core can be produced inexpensively in an injection molding process. Cursor pads 5.1, 5.7 are then applied by gluing or some other arrangement on elevations 7.1, 7.7, as shown here.

FIG. 4 shows a steering assembly 50 as an exemplary embodiment of a vehicle system assembly 50, in which an inductive linear displacement sensor 1 is formed by steering actuator rod 12 of FIG. 1 or cursor bands 4.1, 4.2 located thereon and stators 2.1, 2.2. Alternatively, a mutual stator 2 can also be used.

Linear displacement sensor 1 is designed to determine the linear position and/or the linear path of the cursor covered in a direction of movement X with cursor bands 4.1, 4.2 relative to stators 2.1, 2.2. Stators 2.1, 2.2 each have an excitation coil 9.1, 9.2 and a sensor coil set 3.1, 3.2, which are arranged in a manner known to the skilled artisan on or in the respective stator 2.1, 2.2, which in the present case is formed by printed circuit boards. The two sensor coil sets 3.1, 3.2 are each assigned to one of cursor bands 4.1, 4.2 or are arranged parallel to them.

Cursor pads 5, which are adjacent to one another and transverse to the longitudinal extent of cursor bands 4.1, 4.2, are arranged with an offset V to one another. This is shown, by way of example, by cursor pads 5.1, 5.7, between which the offset V is marked. In other words, cursor pads 5 of the respective cursor bands 4.1, 4.2 are each attached at different lengths or positions of steering actuator rod 12 when considered in terms of the extent. In addition, cursor band 4.2 has fewer cursor pads 5 than cursor band 4.1, in the present case, for example, five cursor pads 5 in cursor band 4.2 and six cursor pads 5 in cursor band 4.1.

In the present case, cursor pads 5 and non-coupling sections 6 have a rectangular shape. Although this is easy to implement in terms of production technology, it is not necessary for the function in cursor bands 4.1, 4.2. Thus, for example, it is alternatively possible to form cursor pads 5 and/or non-coupling sections 6 with a rectangular shape with rounded corners, with an elliptical shape, or with some other shape.

Stators 2.1, 2.2 are located at a distance from cursor bands 4.1, 4.2 and parallel thereto. In addition, stators 2.1, 2.2 have a common evaluation circuit 8 or individual evaluation circuits 8.1, 8.2 in each case, which can, however, be interconnected or work together. Evaluation circuit 8 is set up to determine the relative position of the cursor of steering actuator rod 12 or a covered linear path relative to stators 2.1, 2.2 as a function of the inductive coupling between excitation coils 9.1, 9.2 and the two sensor coil sets 3.1, 3.2 of stators 2.1, 2.2 by means of the cursor in an operating state of inductive linear displacement sensor 1 according to the present exemplary embodiment, therefore, when inductive linear displacement sensor 1 is turned on. From the linear position of steering actuator rod 12 relative to stators 2.1, 2.2 determined in this way, the linear position, linear path, and/or linear speed of steering actuator rod 12 relative to stators 2.1, 2.2 can then be determined in a manner known to the skilled artisan by means of evaluation circuit 8.

Depending on the linear location or linear position of steering actuator rod 12 relative to stators 2.1, 2.2, one or more cursor pads 5 of cursor bands 4.1, 4.2 are operatively connected to the respective excitation coils 9.1, 9.2 and sensor coil sets 3.1, 3.2. Non-coupling sections 6 located between cursor pads 5 are substantially not operatively connected to excitation coils 9.1, 9.2 and sensor coil sets 3.1, 3.2. Cursor pads 5 thus establish an inductive coupling of excitation coils 9.1, 9.2 with sensor coil sets 3.1, 3.2, respectively, which ensures a unique combination of output signals of sensor coil sets 3.1, 3.2, as can be gathered from FIG. 4.

Figure 5:
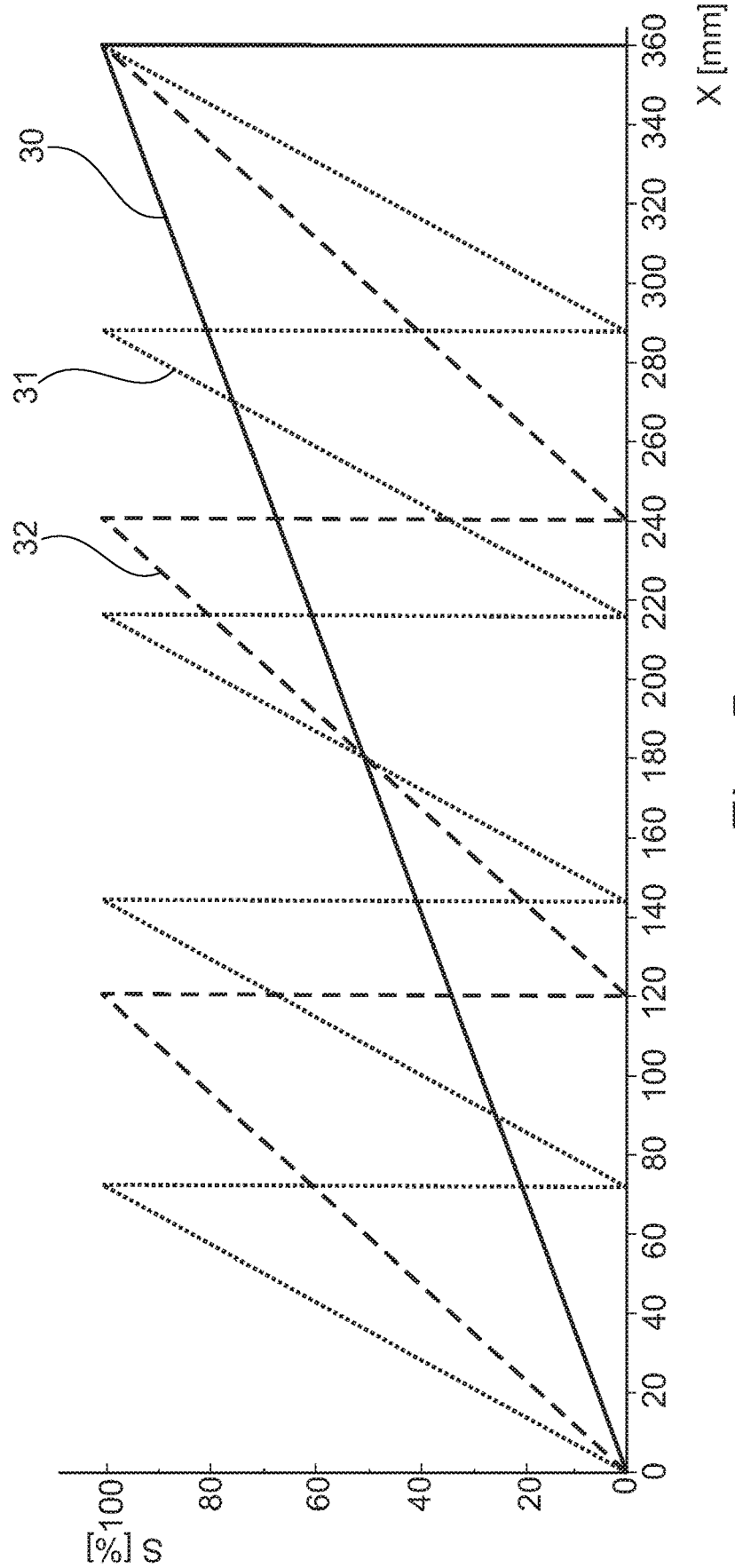
FIG. 5 shows a view of a signal-linear path diagram of the sensor coils in the inductive linear displacement sensor of FIG. 4.

FIG. 5 shows the signal strength S in % of the output signals 31, 32 of sensor coil sets 3.1, 3.2 generated as triangular signals over the covered linear path X in the direction of motion X. These output signals 31, 32 are passed to evaluation circuit 8 for evaluation. Output signals 31, 32 of sensor coils 3.1, 3.2 are combined by evaluation circuit 8 to form a resulting signal 30, which gives the linear path X covered.

Cursor bands 4.1, 4.2 form different nonius tracks with a different number of cursor pads 5 with corresponding non-coupling sections 6, wherein cursor pads 5 and non-coupling sections 6 of the two cursor bands 4.1, 4.2 are designed and arranged relative to each other such that an evaluation of the relative position of the movable part to stators 2.1, 2.2 is made possible by means of evaluation circuit 8 in the manner of the nonius principle.

Figure 6:
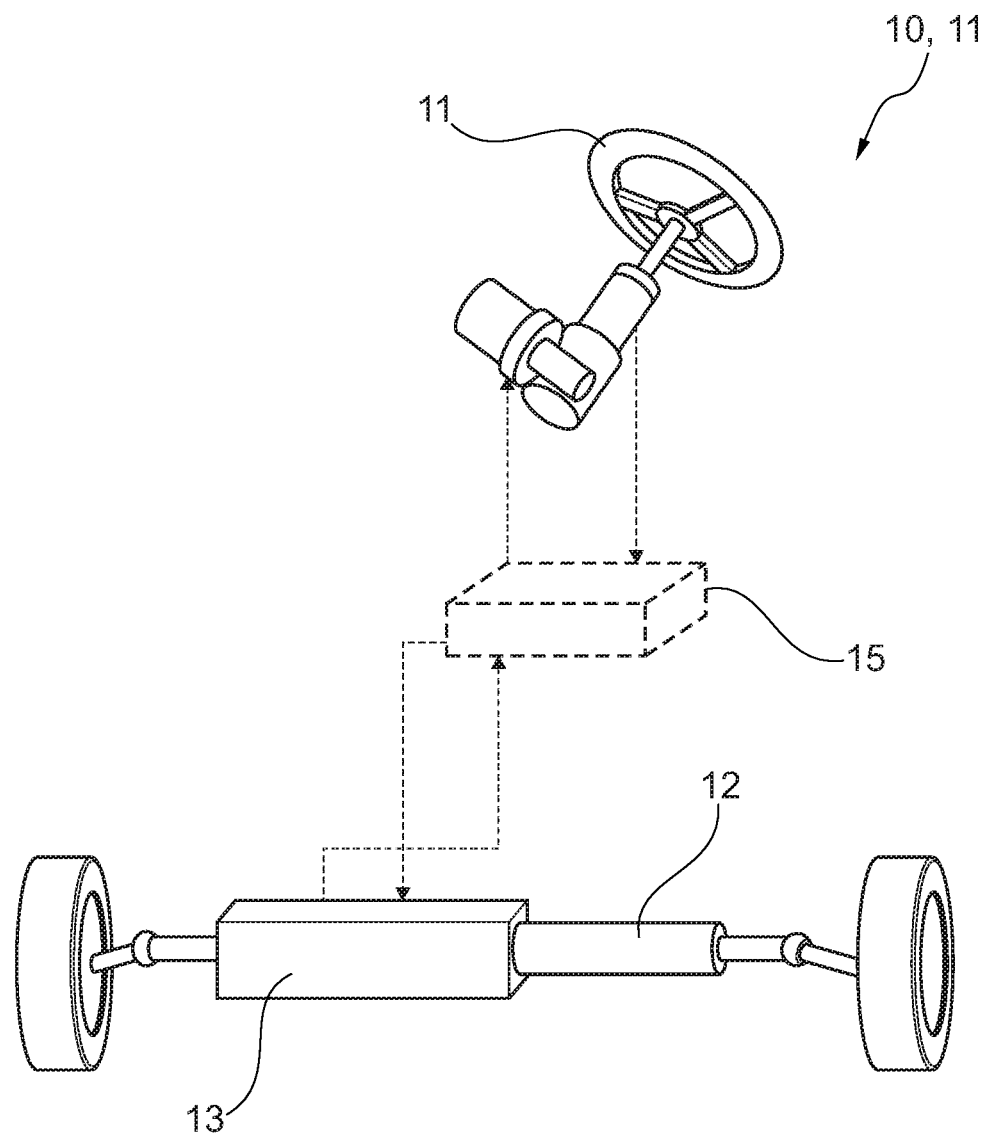
FIG. 6 shows a principal view of a steering system of a vehicle.
Figure 7:
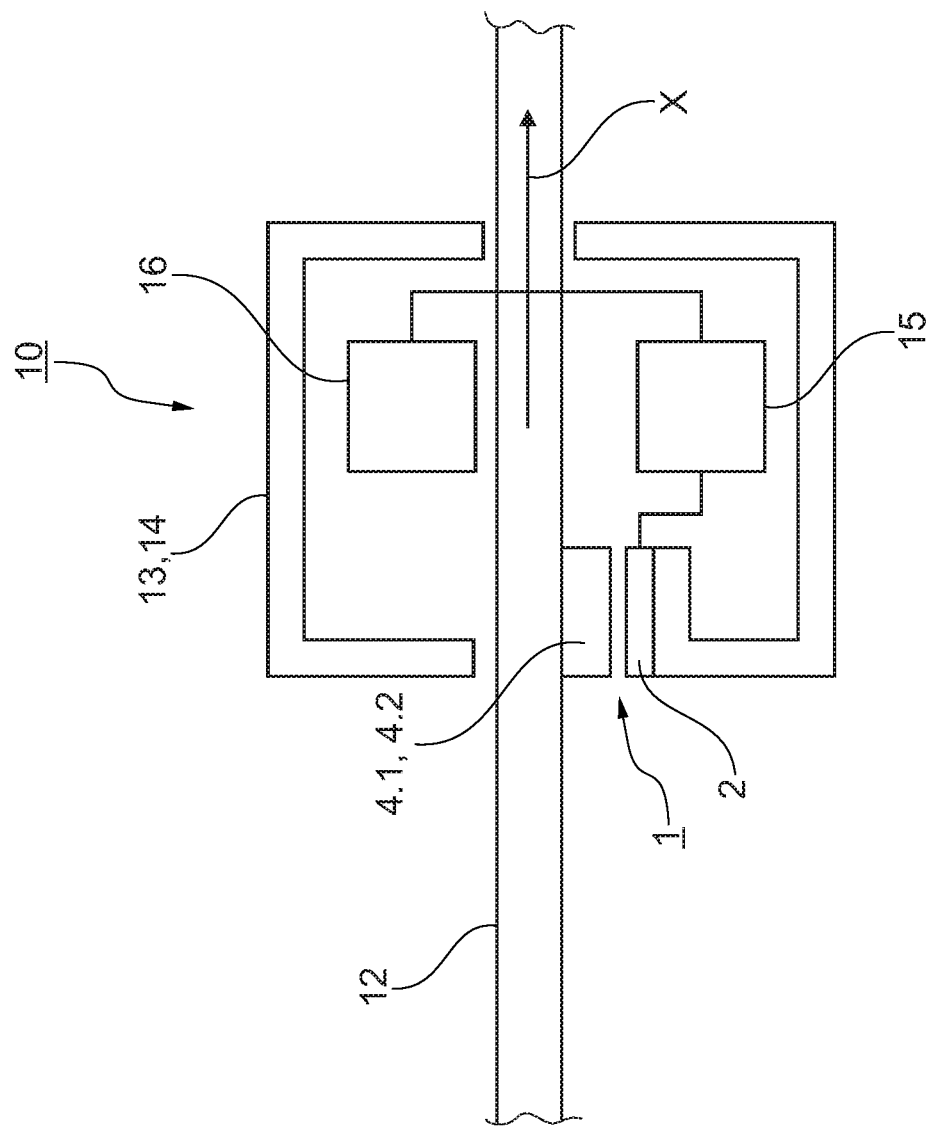
FIG. 7 shows a principal view of a steering unit of the steering system of FIG. 6.

Now, in vehicle system 10, in the present example in the form of steering system 10, in vehicle 100 as shown in FIGS. 6 and 7, stator 2 or stators 2.1, 2.2 can be attached to an immovable or non-movable part. When steering actuator rod 12 is moved, the cursor also moves with it, namely, past stators 2.1, 2.2. In a manner known to the skilled artisan, excitation coils 9.1, 9.2 provide excitation or eddy current generation in cursor pads 5, which in turn are each detected by sensor coil sets 3.1, 3.2. As a result, evaluation circuit 8 can measure a linear path of the movement of the cursor in the direction of movement X or a linear position, therefore, a position in the linear direction of movement X, of the cursor relative to the corresponding linear position of stators 2.1, 2.2 according to the nonius principle with cursor bands 4.1, 4.2 having cursor pads 5 which are offset relative to one another and differ in number. The linear position or linear path of steering actuator rod 12 or rack can be inferred from this.

FIG. 6 shows a steering system 10 of a vehicle in the form of an automobile, which is designed in the form of a steer-by-wire system.

In so-called steer-by-wire systems, in which the steering column is omitted, the system is provided first by a man-machine interface and second by a positioning device on the wheels of the vehicle. The first-mentioned unit is located in the vehicle interior and preferably includes a steering wheel with steering angle sensor technology and a reset device. The second-mentioned positioning device is connected to the preferably two front wheels and is formed by a position control loop with a target value and an actual value. As is common in a position control loop, control takes place in digital form using a position control algorithm in a microprocessor or other digital control or a hardwired algorithm in a so-called state machine. In principle, however, analog controls or analog/digital hybrid controls are also conceivable for the control task.

In order to be able to carry out the control precisely, the position sensor is of great importance. In principle, angle sensors or linear displacement sensors can be considered as position sensors. The embodiment chosen here provides linear displacement sensor 1 of FIG. 1 on steering actuator rod 12 of steering system 10 (see FIG. 7).

Steering system 10 comprises a steering element 11, which in the present case is designed as a steering wheel. The driver of vehicle 100 wishes to steer the vehicle by means of steering element 11, and for this purpose turns the steering wheel in a certain direction by a certain steering angle. This steering angle and the steering torque are captured by a sensor system installed on the steering wheel. To be precise, a control unit 15 (also known as an electronic control unit, or ECU for short) of steering system 10 is electronically connected to the corresponding sensor system and receives the driver's steering request (steering angle and steering torque) and forwards it to a power unit 13, which is in turn connected to control unit 15 and is often referred to as a power pack.

The steering is based on a position control loop with a target value and an actual value. By means of inductive linear displacement sensor 1 in power unit 13 (see FIG. 7), the actual position of the wheels of the vehicle can be determined. Steering actuator 16 (see FIG. 7), also in power unit 13, is then controlled by control unit 15 to actuate the steering according to the driver's request. This is done by moving steering actuator rod 12 linearly to the right or left, and thereby moving the wheels of vehicle 100 accordingly. This continues until linear displacement sensor 1 informs control unit 15 that the target position, which control unit 15 has specified according to the driver's steering wheel actuation, has been reached.

FIG. 7 shows a more detailed schematic diagram of steering system 10, which also shows the components of power unit 13. Linear displacement sensor 1 is located with stator 2 (which can be formed by multiple stators 2.1, 2.2) on a housing 14 of power unit 13, wherein cursor bands 4.1, 4.2 are fastened to steering actuator rod 12 and are arranged to be movable relative to stator 2. For example, housing 14 can include a recess or pocket in which stator 2 or stators 2.1, 2.2 can be embedded.

The otherwise necessary and costly cabling is eliminated by the integration of linear displacement sensor 1 into power unit 13, because the cabling existing in power unit 13 can be used or advantageously expanded. In addition, the interfaces and the supply lines of the electronics on stators 2.1, 2.2 of linear displacement sensor 1 do not need be protected against short circuits of the supply lines and output lines of linear displacement sensor 1. This usually allows simplified electronics and a simpler and more cost-effective manufacturing process for the semiconductor technologies used. Due to a more compact design of this embodiment, the overall arrangement is also less sensitive to electromagnetic radiation from interference fields, by which an increase in the operational robustness of the sensor technology is achieved.

The operating principle of steering unit 10, as described above, is such that control unit 15 of steering system 10 within power unit 13 receives the driver's steering request when the driver of vehicle 100 actuates steering element 11. Control unit 15 can then use the linear position or linear path of steering actuator rod 12, which it obtains or can calculate from the measurements of linear displacement sensor 1, to actuate the electromechanical actuator or steering actuator 16 to control the steering of vehicle 100 in accordance with the steering request expressed by the driver by actuating steering element 11.

Actuator 16 is actuated until the target position according to the driver's steering request is reached. This is the case when the control difference E=actual position—target position is zero. The actual position in turn emerges from the measurements of linear displacement sensor 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An elongate body for a vehicle system of a vehicle, the elongate body comprising:

at least one cursor band for an inductive linear displacement sensor, the at least one cursor band extending in a direction of a longitudinal extent of the elongate body, the at least one cursor band having a plurality of electrically conductive cursor pads in order to inductively couple at least one excitation coil to at least one sensor coil of a stator of the linear displacement sensor, and the at least one cursor band having non-coupling sections which are electrically less conductive or non-conductive with respect to the cursor pads, the cursor pads being spaced apart from one another in the direction of the longitudinal extent by the non-coupling sections, and the cursor pads of the at least one cursor band being formed on the elongate body, wherein the cursor pads are formed as elevations that protrude from a surface of the elongate body that extends in the direction of the longitudinal extent of the elongate body or the cursor pads are disposed on elevations that protrude from the surface of the elongate body, and wherein the non-coupling sections are provided between the elevations, such that with respect to the surface of the elongate body, the cursor pads are elevated relative to the non-coupling sections.

2. The elongate body according to claim 1, wherein the elongate body has at least two cursor bands, the cursor pads of the at least two cursor bands being arranged offset from one another in the direction of the longitudinal extent of the at least two cursor bands.

3. The elongate body according to claim 2, wherein the at least two cursor bands are arranged on opposite or adjacent sides of the elongate body.

4. The elongate body according to claim 2, wherein the at least two cursor bands each have a different number of cursor pads.

5. The elongate body according to claim 1, wherein a cross section of the elevations has a mushroom shape with a column that protrudes from the surface of the elongate body and a platform disposed on top of the column, wherein a top side of the platform faces away from the surface of the elongate body and a bottom side of the platform faces towards the surface of the elongate body and is spaced apart from the surface of the elongate body.

6. The elongate body according to claim 5, wherein the top side of the elevations are flattened.

7. The elongate body according to claim 1, wherein the non-coupling sections are formed by grooves between the cursor pads.

8. The elongate body according to claim 1, wherein the cursor pads of the at least one cursor band are integrally bonded to the elongate body.

9. The elongate body according to claim 1, wherein the elongate body and the at least one cursor band are formed in one piece.

10. The elongate body according to claim 1, wherein the elongate body is formed of a support material or of a plastic, to which the cursor pads are applied in the form of conductive platelets and/or conductive coatings.

11. The elongate body according to claim 1, wherein the elongate body is formed as a steering actuator rod, a piston rod, or a rail.

12. A vehicle system assembly comprising:
the elongate body according to claim 1; and
an inductive linear displacement sensor, wherein the linear displacement sensor has a stator with the at least one excitation coil and the at least one sensor coil as well as an evaluation circuit, wherein the evaluation circuit is configured to detect a linear position of the elongate body based on the at least one cursor band relative to the stator as a function of the inductive coupling between the at least one excitation coil and the at least one sensor coil.

13. A steering system comprising the vehicle system assembly according to claim 12, wherein the steering system is a steer-by-wire system with a control unit and an electromechanical actuator, wherein the control unit is coupled to the linear displacement sensor and is set up to convert the position, detected by the linear displacement sensor, of the elongate body, which is a steering actuator rod, into a steering command for the electromechanical actuator and to transmit the steering command to the electromechanical actuator so that the electromechanical actuator executes a steering movement corresponding to the steering command.

14. A vehicle comprising the vehicle system assembly according to claim 12.

15. The elongate body according to claim 1, wherein the elongate body and the at least one cursor band are monolithic.

* * * * *